United States Patent
Davis

(10) Patent No.: US 6,601,537 B1
(45) Date of Patent: Aug. 5, 2003

(54) FOAL FEEDER AREA BARRIER

(76) Inventor: Rick M. Davis, 18133 Thomas Blvd., Hudson, FL (US) 34667

( * ) Notice: Subject to any disclaimer, the term of this patent is extended or adjusted under 35 U.S.C. 154(b) by 0 days.

(21) Appl. No.: 10/097,022

(22) Filed: Mar. 12, 2002

Related U.S. Application Data

(60) Provisional application No. 60/275,239, filed on Mar. 12, 2001.

(51) Int. Cl.[7] .............................. A01K 1/00; A01K 5/00
(52) U.S. Cl. ....................................... 119/502; 119/521
(58) Field of Search ................... 119/454, 472, 119/473, 475, 478, 502, 513, 521, 522; 49/55; 256/1

(56) References Cited

U.S. PATENT DOCUMENTS

| | | | | |
|---|---|---|---|---|
| 673,703 A | * | 5/1901 | Davis et al. ................. 119/524 |
| 1,128,769 A | * | 2/1915 | Ferris et al. ................. 119/502 |
| D178,270 S | * | 7/1956 | Babson ........................ 119/521 |
| 3,421,478 A | * | 1/1969 | Warmerdam ................. 119/522 |
| 4,171,684 A | * | 10/1979 | Herr et al. .................... 119/521 |
| 4,262,883 A | * | 4/1981 | Feeken ........................ 119/513 |
| 4,611,431 A | * | 9/1986 | Lauro .............................. 49/55 |
| 4,844,424 A | * | 7/1989 | Knudslien .................... 256/26 |
| 5,152,248 A | * | 10/1992 | Hart ............................. 119/475 |
| 2002/0017794 A1 | * | 2/2002 | Anderson et al. ............ 293/102 |

* cited by examiner

Primary Examiner—Charles T. Jordan
Assistant Examiner—Elizabeth Shaw
(74) Attorney, Agent, or Firm—Joseph N. Breaux

(57) ABSTRACT

A foal feeder area barrier for creating a foal feed area. The barrier includes a number of adjustable steel tubes that are configurable to connect to corner section of a stall, corral or the like while at the same time creating a gate entry way sized to allow foals through the barrier but which is sufficiently small to prevent full grown horses to pass therethrough.

1 Claim, 2 Drawing Sheets

FOAL FEEDER AREA BARRIER

This application claims the benefit of Provisional application No. 60/275,239, filed Mar. 12, 2001.

TECHNICAL FIELD

The present invention relates to horse accessories and more particularly to a foal feeder area barrier that includes a temporary adjustable barrier with a foal feeder/gate entryway for use in stalls, paddocks, stables, pastures, corrals and the like to create a foal feed area and for stopping full grown horses from entering the foal feed area while allowing a foal free access to the feed area thru a foal feeder gate entry way; the adjustable barrier being formed from a number of adjustable steel tubes that are fastened together with fasteners to form a barrier section having an adjustable foal sized feeder/gate entry way that allows a user to adapt the size of the feeder/gate entry way to a particular foal or foals; the adjustable steel tubes including horizontal tube members and vertical tube members; the horizontal tube members including angled wall attachment fittings at the ends thereof for attaching the horizontal tubes to a wall or the like; the vertical tubes including a ground contact mechanism such as a spike or a rubber padded bumper.

BACKGROUND OF INVENTION

It is often necessary to separate mares and other full grown horse from areas where foal feed is placed so that they will not eat the foals feed. It would be desirable, therefore, to have a portable, temporary barrier which would allow a person taking care of horses to create a foal feeding area that would stop larger horses but which would provide an opening/entry way through which foals could enter to reach feed placed in the foal feeding area.

SUMMARY OF INVENTION

It is thus an object of the invention to provide a foal feeder area barrier that includes a temporary adjustable barrier with a foal feeder/gate entryway for use in stalls, paddocks, stables, pastures, corrals and the like to create a foal feed area and for stopping full grown horses from entering the foal feed area while allowing a foal free access to the feed area thru a foal feeder gate entry way; the adjustable barrier being formed from a number of adjustable steel tubes that are fastened together with fasteners to form a barrier section having an adjustable foal sized feeder/gate entry way that allows a user to adapt the size of the feeder/gate entry way to a particular foal or foals; the adjustable steel tubes including horizontal tube members and vertical tube members; the horizontal tube members including angled wall attachment fittings at the ends thereof for attaching the horizontal tubes to a wall or the like; the vertical tubes including a ground contact mechanism such as a spike or a rubber padded bumper.

Accordingly, foal feeder area barrier is provided. The a foal feeder area barrier that includes a temporary adjustable barrier with a foal feeder/gate entryway for use in stalls, paddocks, stables, pastures, corrals and the like to create a foal feed area and for stopping full grown horses from entering the foal feed area while allowing a foal free access to the feed area thru a foal feeder gate entry way; the adjustable barrier being formed from a number of adjustable steel tubes that are fastened together with fasteners to form a barrier section having an adjustable foal sized feeder/gate entry way that allows a user to adapt the size of the feeder/gate entry way to a particular foal or foals; the adjustable steel tubes including horizontal tube members and vertical tube members; the horizontal tube members including angled wall attachment fittings at the ends thereof for attaching the horizontal tubes to a wall or the like; the vertical tubes including a ground contact mechanism such as a spike or a rubber padded bumper.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY EMBODIMENTS

Figure 1:
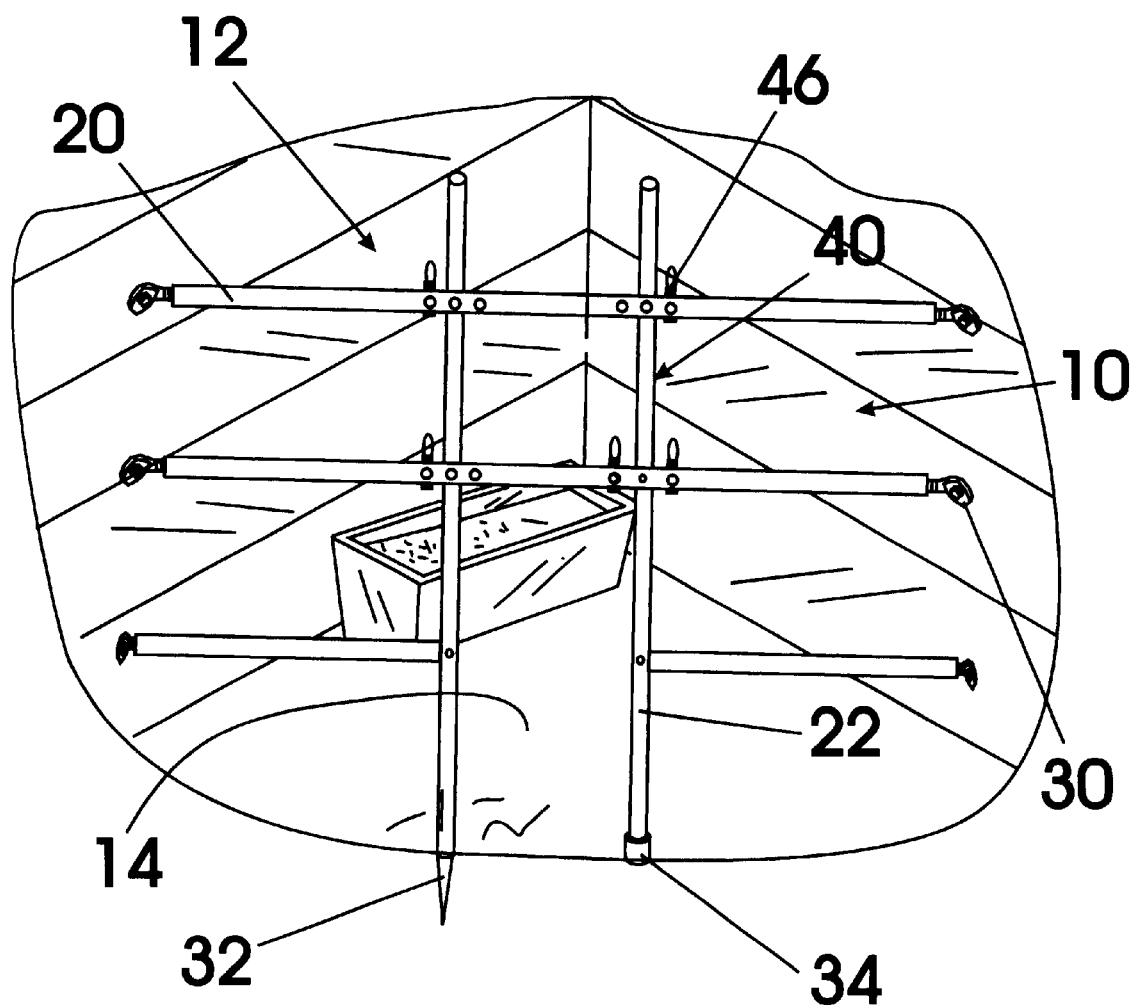
FIG. 1 is a perspective view showing an exemplary embodiment of the foal feeder/gate entry way.
Figure 2:
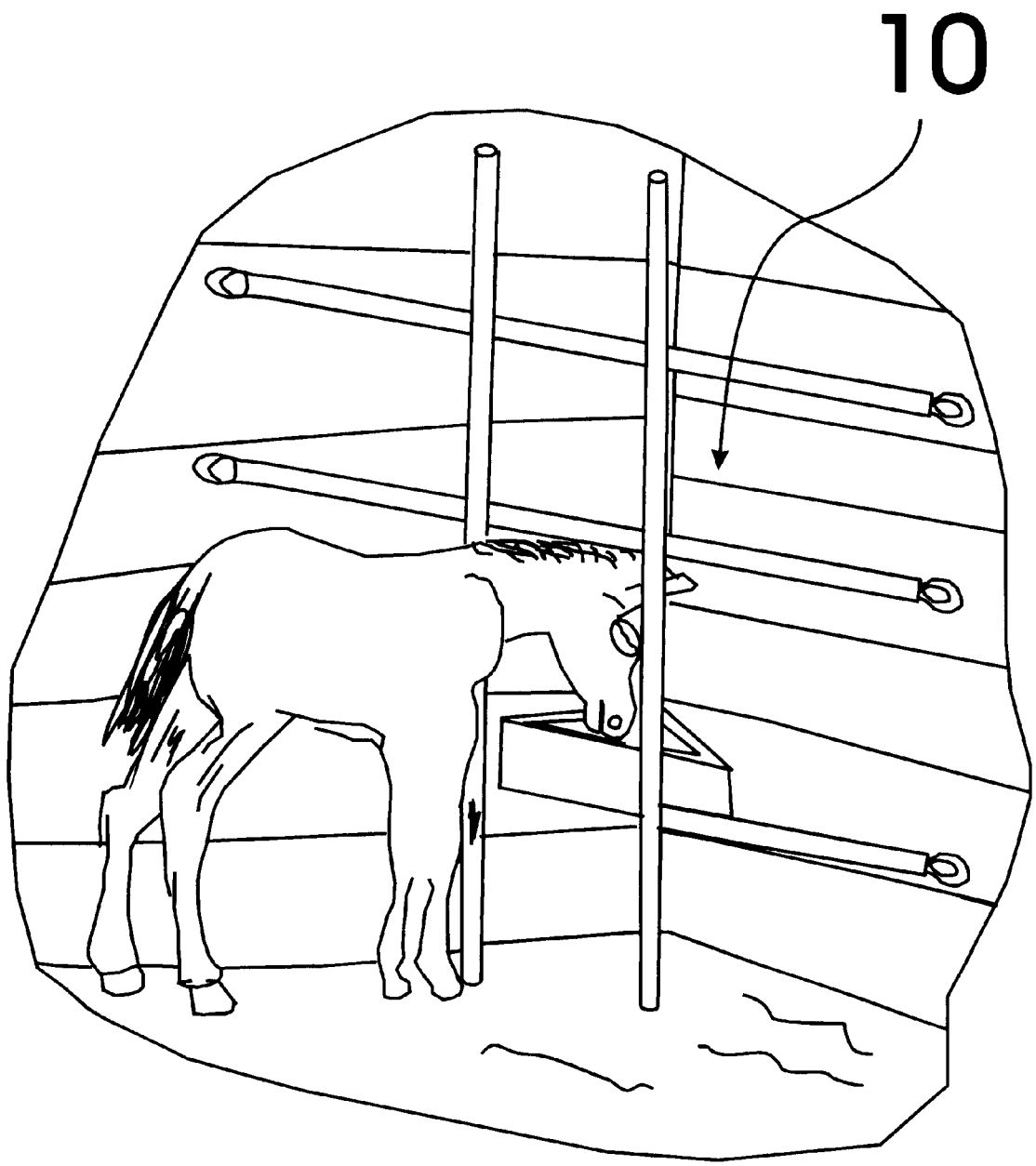
FIG. 2 is a second view of the foal feeder/gate entry way and a representative foal having access to a foal feed trough.

FIGS. 1 and 2 show various aspects of an exemplary foal feeder area barrier of the present invention generally designated 10. Foal feeder area barrier includes an adjustable barrier generally designated 12 having an adjustable foal sized feeder/gate entry way generally designated 14 provided therethrough for allowing a foal to enter a feed area 16 but which prevents a full grown horse from entering. The adjustable barrier is formed from a number of adjustable horizontal and vertical tube members 20, 22 respectively. The horizontal tube members each include an angled wall attachment fitting 30 that is used to attach the adjustable barrier to a fence, paddock, or stable wall. Each of the vertical tubes 22 is provided with a spike portion 32, a rubber pad 34 or other ground contact mechanism. In this embodiment vertical tube members 22 include a number of adjustment holes 40 that allow a user to adjust the height of entry way 14. The width of entry way 14 can be adjusted by inserting the vertical members through different holes 36 formed through two or more horizontal tube members 20. It can be seen from the preceding description that a foal feeder area barrier has been provided.

It is noted that the embodiment of the foal feeder area barrier described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A temporary adjustable barrier comprising:

a number of adjustable steel tubes fastened together with fasteners to form a barrier section having an adjustable foal sized feeder/gate entry way that allows a user to adapt the size of the feeder/gate entry way to a particular foal or foals;

the adjustable steel tubes including horizontal tube members and vertical tube members;

the horizontal tube members including angled wall attachment fittings at the ends thereof for attaching the horizontal tubes to a wall or the like;

the vertical tubes including a ground contact mechanism.

* * * * *